United States Patent [19]

Dietz

[11] Patent Number: 4,719,271

[45] Date of Patent: Jan. 12, 1988

[54] POLYMERIZATION OF OLEFINS

[75] Inventor: Richard E. Dietz, Borger, Tex.

[73] Assignee: Phillips Petroleum Company, Bartlesville, Okla.

[21] Appl. No.: 530,849

[22] Filed: Sep. 9, 1983

Related U.S. Application Data

[62] Division of Ser. No. 380,788, May 21, 1982, abandoned.

[51] Int. Cl.$^4$ .............................. C08F 4/02; C08F 4/64
[52] U.S. Cl. ...................................... 526/114; 526/113; 526/118; 526/119; 526/120; 526/122; 526/125; 526/123; 526/352; 526/904
[58] Field of Search ............... 526/125, 113, 114, 116, 526/120, 122, 123, 352, 904, 118, 119

[56] References Cited

U.S. PATENT DOCUMENTS

| | | | |
|---|---|---|---|
| 4,384,087 | 5/1983 | Capshew | 526/125 X |
| 4,405,769 | 9/1983 | Capshew et al. | 526/125 X |
| 4,427,573 | 1/1984 | Miles et al. | 526/125 X |

*Primary Examiner*—Joseph L. Schofer
*Assistant Examiner*—F. M. Teskin
*Attorney, Agent, or Firm*—John R. Casperson

[57] ABSTRACT

A catalyst, a process of forming the catalyst, and polymerizing at least one alpha-olefin with the catalyst, said catalyst produced by precipitating a composition from a solution of a metal halide, for example, magnesium dihalide, and a transition metal compound, for example, titanium tetraalkoxide, in the presence of a particulate diluent, for example, polymeric fibrils, with an agent selected from among specified organometallic compounds, metal halides and oxygen-containing metal halides, hydrogen halides and organic acid halides. The composition is preferably further treated with a halide ion exchanging source, for example, titanium tetrahalide to form a particularly active catalyst. The catalyst is preferably used in combination with a cocatalyst comprising a metal hydride of organometallic compound selected from an element of Periodic Groups IA, IIA and IIIA.

16 Claims, No Drawings

POLYMERIZATION OF OLEFINS

BACKGROUND OF THE INVENTION

This is a divisional application of copending application Ser. No. 380,788, filed May 21, 1982, now abandoned.

This invention relates to a process for polymerizing olefins. In another aspect, this invention relates to a process for making a polymerization catalyst. In another aspect, this invention relates to a process for polymerizing alpha-olefins using a catalyst system wherein the catalyst is prepared by a novel process. In another aspect, this invention relates to a novel process for forming a catalyst which can be used with a cocatalyst to form a catalyst system for the polymerization of alpha-olefins.

It is known to polymerize alpha-olefins and mixtures thereof at low pressures with coordination catalysts. In this process, the catalysts used are prepared from mixtures of compounds of transition elements of Subgroups IVB, VB, VIB of the Periodic Table and the organometallic compounds of the elements of Groups I to III of the Periodic Table. The Periodic Table referred to herein is as shown on page B-2, 45th Edition (1964), of the Handbook of Chemistry and Physics, Chemical Rubber Co. The polymerization is generally carried out in suspension, in solution or even in a gaseous phase.

Because of greater process economics, it is desirable to carry out olefin polymerization reactions, particularly polymerization reactions involving ethylene and predominantly ethylene-containing copolymers, in an inert diluent at a temperature at which the resulting polymer does not go into solution, with the polymer being recovered without elaborate steps to remove the catalyst. In order for this more economical method of manufacture to be feasible from a practical standpoint the catalyst must be capable of producing polymer in high productivities in order to maintain the residual catalyst level in the final polymer at a very low level. The activity of an olefin polymerization catalyst is thus one important factor in the continuous search for a catalyst useful for the polymerization of alpha-olefins. It is also desirable that the process used in forming the catalyst be such as to allow ease in preparation and to allow control over the final catalyst formed.

In addition to catalyst productivity another important aspect of a polymerization process and catalyst is the properties of the polymer particles produced. It is desirable to produce polymer particles which are characterized by strength, uniformity of size, and a relatively low amount of fines. Although polymer fluff having relatively high percentages of fines can be handled with plant modifications, production of a polymer in high productivity with low fines content is highly desirable.

OBJECTS OF THE INVENTION

It is an object of this invention, therefore, to provide an improved process for the polymerization of alpha-olefins.

Another object of this invention is to provide a novel and improved method for preparing a catalyst composition.

A further object of this invention is to provide a novel catalyst composition well adapted for the polymerization of alpha-olefins.

STATEMENT OF THE INVENTION

According to the invention, a polymerization catalyst is formed by precipitation from a solution of a metal halide compound and a transition metal compound in the presence of a particulate diluent. The catalyst feeds easily into polymerization reactor and when used for the polymerization of ethylene can produce a polyethylene product having a low content of fines. The catalyst can be made even more active by contacting it with a source of halide ion to form an activated catalyst. The catalyst can be improved so that it will yield a more desirable polymer product by forming a coating of prepolymer thereon, either before or after activation with halide. The activated composite can be employed in combination with cocatalyst for the polymerization of alpha-olefins, and is sufficiently active so that the content of residual catalyst in the polymer product can be maintained at a desirably low level.

DETAILED DESCRIPTION OF THE INVENTION

The catalyst of the present invention comprises a composition of matter resulting from the chemical combination of a metal halide compound and a transition metal compound in the presence of a particulate diluent wherein the metal halide compound is selected from metal dihalides and metal hydroxyhalides and the metal of the metal halide compound is selected from Group IIA and Group IIB metals of the Periodic Table and wherein the transition metal of the transition metal compound is selected from Group IVB and Group VB transition metals of the Periodic Table and the transition metal is bonded to at least one atom selected from oxygen, nitrogen and sulfur, the oxygen, nitrogen and sulfur atoms being in turn bonded to a carbon atom of a carbon containing radical.

The metal halide compound is preferably selected from metal dihalide compounds and metal hydroxyhalide compounds and the metal of the metal halide compound is preferably selected from Group IIA and Group IIB metals, such as for example beryllium, magnesium, calcium and zinc. Some suitable metal halide compounds include for example, beryllium dichloride, beryllium dibromide, beryllium hydroxyiodide, magnesium dichloride, magnesium dibromide, magnesium hydroxychloride, magnesium diiodide, magnesium difluoride, calcium dichloride, calcium dibromide, calcium hydroxybromide, zinc dichloride, zinc difluoride, and zinc hydroxychloride. While metal hydroxyhalide compounds are known in the art, they are not as common and as readily available as metal dihalide compounds; therefore, metal dihalides are preferred. Of the metal dihalides, magnesium dihalides, and particularly magnesium dichloride is preferred because it is readily available and relatively inexpensive and has provided excellent results. The metal dihalide component is generally used in the form of a substantially anhydrous, particulate solid to facilitate its reaction with the transition metal compound. It is also noted that various techniques for converting a metal halide compound to a fine particulate form, such as for example roll milling, reprecipitating, etc., can be used to prepare the metal halide compound for use according to the present invention and that such additional preparation of the metal halide compound promotes the reaction of the metal halide compound with the transition metal compound; however, it does not appear to make any difference in a catalyst of the present invention whether the metal halide compound is in a fine particulate form. That is, polymer productivity, for example, is not a function of the size of the particles of the metal halide compound. Preparation of metal hydroxyhalide compounds are described in K. Soga, S. Katano, Y. Akimoto and T. Kagiya, "Polymerization of alpha-Olefins with Supported Ziegler-type Catalysts", *Polymer Journal*, Vol. 2, No. 5, pp. 128-134 (1973).

The transition metal of the transition metal compound noted above is preferably selected from Group IVB and Group VB transition metals and is generally selected from titanium, zirconium, and vanadium although other transition metals can be employed. The transition metal derivatives most advantageously used in preparing the first catalyst component are preferably described by the formula $M(OR)_a X_{b-a}$ in which M represents a transition metal, b is the valence of M, a is an integer between 0 and 4, and R represents a hydrocarbyl radical having from about 1 to about 20 carbon atoms. For example, R can be selected from among alkyl, cycloalkyl, and aryl groups and combinations thereof such as alkaryl. X represents a halogen atom, for example bromine, chlorine, or iodide, more usually bromine or chlorine. Preferably, M represents titanium, zirconium, and vanadium, more preferably titanium. Exemplary compounds include titanium tetramethoxide, titanium tetraeicosyloxide, titanium tetracyclohexyloxide, titanium tetrabenzyloxide, titanium trimethoxide-n-butoxide, titanium ethoxytrichloride, titanium dibutoxidedioctadecyloxide, titanium diisopropoxydibromide, titanium phenoxytrichloride, titanium trixylenyloxychloride, titanium tetrabromide, titanium tetrachloride and titanium tetraiodide. A titanium alkoxide, represented by the formula $Ti(OR')_4$, wherein R' represents an alkyl radical having from about 2 to to about 8 carbon atoms, for example, titanium tetra-n-butoxide, is presently preferred.

Other transition metal compounds which can be usefully employed include for example titanium tetracetate, zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The molar ratio of the transition metal compound to the metal halide compound can be selected over a relatively broad range. Generally the molar ratio is within the range of about 10:1 to about 1:10, preferably between about 3:1 and 0.5:2, however, the most common molar ratios are within the range of about 2:1 to about 1:2. When titanium tetrahydrocarbyloxide and magnesium dichloride are employed to form the catalyst, a molar ratio of titanium to magnesium of about 2:1 is presently recommended as particularly active catalysts are derived therefrom.

The metal halide compound and the transition metal compound employed in the present invention are normally mixed together during heating. For example, the two components can be refluxed together in a suitable dry solvent or diluent, which is inert to these components and the product produced. Although reference is made throughout the specification to a solution of metal halide and transition metal compound, it is to be understood that the solution may not contain the compounds Per se, but rather, may contain a complex or the like. By the term "inert" is meant that the solvent does not chemically react with the dissolved components such as to interfere with the formation of the product or the stability of the product once it is formed. Such solvents or diluents include, for example, n-pentane, n-hexane, n-heptane, methylcyclohexane, toluene, xylenes and the like. Aromatic solvents such as for example xylene, may be desirable in some instances because the solubility of some metal halide compounds and some transition metal compounds is higher in aromatic solvents as compared to aliphatic solvents. This can be determined easily by the ordinary artisan.

Generally the amount of solvent or diluent employed can be selected over a broad range. Usually the amount of solvent or diluent is within the range of about 1, more preferably about 20, to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed can be higher if the pressure employed is above atmospheric pressure. The pressure employed during the heating step does not appear to be a significant parameter. The heating step insures rapid dissolution of solid metal halides. In addition to the above noted solvents or diluents, more polar solvents or diluents such as nitrobenzene and halogenated hydrocarbons, e.g methylene chloride, chlorobenzene and 1,2-dichloroethane can be used, particularly when producing compositions of the invention having a molar ratio of the transition metal compound to the metal dihalide compound of other than 2:1. In addition, normal saturated alkanols, such as, for example, ethanol, n-butanol and the like, and saturated ethers particularly saturated cyclic ethers such as, for example, tetrahydrofuran, can be used alone or in combination with the previously mentioned solvents or diluents. Mixed solvents or diluents, such as, for example, a mixture of n-hexane and tetrahydrofuran having a volume/volume ratio of, for example, about 50/50 can be employed in solubilizing metal dihalides which are relatively difficult to solubilize, such as, for example, zinc dichloride and the like. Other suitable mixtures of two or more of the above solvents to solubilize the reagents combined to form the catalyst can of course also be used and can be readily determined by one of ordinary skill in the art.

Generally, the time required for heating these two components together is within the range of about 5 minutes to about 10 hours, although in most instances a time within the range of about 15 minutes to about 3 hours is sufficient.

The metal halide compound and transition metal compound are preferably precipitated in the presence of the particulate diluent by use of a suitable precipitating agent. Preferably, the precipitating agent is selected from the group consisting of organometallic compounds in which the metal is selected from metals of Groups I to III of the Periodic Table, metal halides and oxygen-containing halides of elements selected from Groups IIIA, IVA, IVB, VA, and VB of the Periodic Table, hydrogen halides, and organic acid halides expressed as

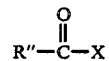

wherein R" is an alkyl, aryl, cycloalkyl group or combinations thereof containing from 1 to about 12 carbon atoms and X is a halogen atom. Mixtures of these materials can also be used.

Some organometallics in which the metal is selected from metals of Group I, Group II, and Group III of the Periodic Table suitable for use as the precipitating agent include, for example, lithium alkyls, Grignard reagents, dialkyl magnesium compounds, dialkyl zinc compounds, organoaluminum compounds, etc. The organoaluminum compound is generally an organoaluminum halide compound which includes for example, dihydrocarbylaluminum monohalides of the formula $R'''_2AlX$, monohydrocarbylaluminum dihalides of the formula $R'''AlX_2$ and aluminum compounds represented by the formula $R'''_3Al_2X_3$ wherein each $R'''$ in the above formulas is individually selected from aryl and linear and branched chain hydrocarbyl radicals containing from 1 to about 20 carbon atoms per radical and can be the same or different and each X is a halogen atom and can be the same or different. Some suitable organoaluminum halide compounds include, for example, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, diisopropylaluminum chloride, methylaluminum sesquibromide, ethylaluminum sesquichloride, ethylaluminum sesquiiodide, and the like. Ethylaluminum sesquichloride and ethylaluminum dichloride, have been employed with good results and are preferred.

Some metal halides and oxygen-containing halides of elements selected from Groups IIIA, IVA, IVB, VA, and VB suitable for use as the precipitating agent preferably include such as, for example, aluminum tribromide, aluminum trichloride, aluminum triiodide, tin tetrabromide, tin tetrachloride, silicon tetrabromide, silicon tetrachloride, phosphorus oxychloride, phosphorus trichloride, phosphorus pentabromide, vanadium tetrachloride, vanadium oxytrichloride, vanadyl trichloride, zirconium tetrachloride, and the like.

The hydrogen halides suitable for use as the precipitating agent include preferably such as, for example, hydrogen chloride, hydrogen bromide, and the like.

The organic acid halides suitable for use as the precipitating agent preferably include such as, for example, acetyl chloride, propionyl fluoride, dodecanoyl chloride, 3-cyclopentylpropionyl chloride, 2-naphthoyl chloride, benzoyl bromide, benzoyl chloride, and the like.

The molar ratio of the transition metal compound to the precipitating agent can be selected over a relatively broad range. Generally, the molar ratio of the transition metal to the precipitating agent is within a range of from about 10:1 to about 1:10, more generally within a range of about 2:1 to about 1:3, still more preferably between about 2:1 to 1:1 since a molar ratio within the latter range usually produces a catalyst which can be employed as an especially active ethylene polymerization catalyst.

The particulate diluent in the presence of which the metal halide compound and transition metal compound are precipitated can be selected from a wide range of materials, for example, silica, silica-alumina, silica-titania, magnesium dichloride and magnesium oxide are suitable, as well as polymeric materials, such as poly(phenylene sulfide). Polyolefins, for example polyethylene or polypropylene, are preferred particulate diluent, because they are generally compatible with polymeric polyolefin product. Polyolefins in fibrous form, such as polyethylene fibrils are preferred, because they have been used with good results.

The polyolefin fibrils can be prepared by diluting a hot solution of the polymer with relatively cool solvent while simultaneously subjecting the mixture to shearing forces imparted by mixing blades such as in a Waring Blender or the like. (See, for example, U.S. Pat. No. 4,013,751, Example 1.)

The resulting fibrils generally have lengths on the order of about 1 to 15 mm and diameters on the order of about 0.005 to 0.1 mm. (The dimensions of the invention fibrils were not determined, so the above figures are based on the above reference as well as U.S. Pat. No. 4,237,081, line, line 53.) Preferably, the metal halide compound and particulate diluent are thoroughly admixed, such as by being milled together, prior to their introduction into the solvent for the metal halide.

Generally, the particulate diluent portion of the catalyst in this embodiment of the invention will comprise from about 5 to about about 75 percent based on total weight of the composition. The total weight of the composition as used here means the combined weights of precipitate and particulate diluent. Usually, about 20 to about 75 weight percent of the material will be diluent. Preferably, about 30 to about 50 weight percent of the material will be particulate diluent. The concentration of the metallic components catalyst can vary over a wide range.

Prepolymer can be polymerized onto the catalyst described above to form an improved catalyst. This material can be recovered and used in polymerization processes to produce polymer product having a more desirable particle size. It can be desirable to treat this type of catalyst with conventional ethylene anti-static agents to aid in handling and metering.

The prepolymerization step can comprise, as indicated above, prepolymerizing a minor but effective amount of aliphatic alpha-olefin onto the catalyst produced by precipitation from the solution of metal halide compound and transition metal compound in the presence of particulate diluent.

The prepolymerizing step can be performed by any method effective for prepolymerizing polymer onto the catalyst. For example, the precipitating step can be entirely carried out under an olefin atmosphere; or the precipitating step can be carried out by adding a portion of the precipitating agent under a dry inert atmosphere followed by adding another portion of the precipitating agent under an olefin atmosphere; or other variations can be employed by one skilled in the art in accordance with the invention. Preferably, the prepolymerizing step is carried out by adding an olefin for example, ethylene, to the catalyst and recovering the improved catalyst which contains polymer deposited thereon, preferably with washing. Improved catalysts prepared in this manner produce low fines content polymer product when used in polymerization processes.

The monomer which is utilized for prepolymerization can be the same as or different from the monomer used in the polymerization process as set out hereinafter. Preferably the same monomer is used. The aliphatic mono-1-olefins can preferably have between 2 and 10 carbon atoms per molecule and broadly between 2 and about 18 carbon atoms per molecule. Prepolymerization can also use conjugated diolefins, preferably such as those having from 4 to 8 carbon atoms per molecule. Most preferably ethylene is used for prepolymerization, since its properties will be similar to those of the product when the catalyst is employed for ethylene polymerization.

The weight of prepolymer is based on the total weight of the composition, as indicated above, and is generally from about 1 to about 50% by weight of the total composition, preferably from about 3% to about 40% by weight, and more preferably from about 5% to about 20% by weight of the total composition since this is believed to result in a catalyst with good feeding characteristics that can produce a polymer having relatively low fines content. The total weight of the composition here refers to the combined weights of precipitate, particulate diluent and prepolymer.

The catalyst is preferably treated with a halide ion exchanging source, preferably a halogenated transition metal compound to form an activated catalyst. The treatment can be conducted before or after prepolymerization, preferably after, and is carried out by contacting the catalyst with the halogenated transition metal compound at a temperature sufficient to provide a reaction. Suitable preferred compounds can be represented by the formula M in which $M'X_c(OR)_{d-c}$ in which $M'$ is selected from the group consisting of zirconium, titanium, vanadium, silicon and tin, d is the valence of $M'$, X stands for bromine, chlorine or iodine or mixtures thereof, c is less than d and is an integer of 1 to 4 and R is an alkyl, cycloalkyl or aryl group and combination thereof, such as alkaryl, containing from 1 to about 20 carbon atoms. More preferably, c equals d and is 2, 3 or 4. Most preferably M comprises titanium and c is 4. Specific examples of suitable compounds include titanium tetrachloride, titanium dibromodichloride, titanium iodotrichloride, n-butoxytrichlorotitanium, chlorotridodecyloxytitanium, bromotricyclohexyloxytitanium, diphenoxydichlorotitanium, silicon tetrachloride, zirconium tetrachloride, tin tetrachloride and the like. A presently preferred compound comprises a titanium tetrahalide represented by the formual $TiX_4$ wherein X represents a halogen atom, for example, chlorine or bromine. Titanium tetrachloride is presently preferred because of availability and relatively low cost.

While it may not be necessary in all instances to employ a cocatalyst with the catalyst of the present invention, the use of cocatalyst is recommended for good results. Preferably then the catalyst after prepolymerization and halide in activation treatment is combined with a cocatalyst, to form a highly active catalyst system useful for the polymerization of olefins. The cocatalyst preferably comprises a metal hydride or an organometallic compound wherein the metal is preferably selected from an element of Groups IA, IIA and IIIA of the Periodic Table. In other words, the cocatalyst can be a hydride of the metals of Groups IA, IIA, and IIIA or an organic compound of the metals.

The cocatalytic component of the catalyst system is preferably an organoaluminum compound of the formula $AlR_eY_{3-e}$ where R represents a hydrocarbyl radical containing from 1 to about 20 carbon atoms, Y represents a monovalent radical selected from the group consisting of hydrogen and halogen, and e is an integer of 1 to 3. Exemplary compounds include trihydrocarbyl aluminum compounds such as trimethylaluminum, triethylaluminum, tridodecylaluminum, trieicosylaluminum, triphenylaluminum, dihydrocarbylaluminum halides such as diethylaluminum chloride, dibutylaluminum bromide; hydrocarbylaluminum dihalides such as methylaluminum dichloride, isopropylaluminum dibromide; and mixtures such as hydrocarbylaluminum sesquihalides such as ethylaluminum sequichloride. Presently preferred are trialkylauminum compounds, represented by the formula $AlR'''_3$ wherein $R'''$ represents an alkyl radical having from about 2 to about 8 carbon atoms.

It is within the scope of this invention to employ one or more adjuvants, these being polar organic compounds, i.e., Lewis bases (electron donor compounds) with the titanium tetrahalide component or the cocatalyst component or both. Suitable compounds for this purpose are described in U.S. Pat. No. 3,642,746, the disclosure of which is incorporated by reference. They include alcoholates, aldehydes, amides, amines, arsines, esters, ethers, ketones, nitriles, phosphines, phosphites, phosphoramides, sulfones, sulfoxides and stibines. Exemplary compounds include sodium ethoxide, benzaldehyde, acetamide, triethylamine, trioctyl arsine, ethyl acetate, diethyl ether, acetone, benzonitrile, triphenyl phosphine, triphenyl phosphite, hexamethyl phosphoric triamide, dimethyl sulfone, dimethyl sulfoxide, dibutyl sulfoxide, triethyl stibine and dimethyl aniline.

Preferred esters are the lower alkyl esters (1 to 4 carbon atoms per molecule) of benzoic acid which may be additionally substituted in the para position to the carboxyl group with a monovalent radical selected from the group consisting of —F, —Cl, —Br, —I, —$CH_3$, —$OR'''$, —$OOCR'''$, —SH, —$NH_2$, —$NR'''_2$, —$NHCOR'''$, —$NO_2$, —CN, —CHO, —$COR'''$, —$COOR'''$, —$C_2NH_2$, —$CONR'''_2$, —$SO_2R'''$, and —$CF_3$. Exemplary compounds include ethyl anisate (ethyl p-methoxybenzoate), methyl para-toluate, methyl benzoate, ethyl benzoate, ethyl p-dimethylaminobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred compounds are ethyl anisate, ethyl benzoate and methyl para-toluate. Generally if an adjuvant is used at all, it is used in the polymerization of propylene. In the preferred embodiments of this invention where ethylene is polymerized, an adjuvant is generally not used.

The molar ratio of organolauminum compound(s) to adjuvant(s) when employed is generally in the range of about 1:1 to about 300:1. The molar ratio of titanium compound to adjuvant(s) when employed is generally in the range of about 1:1 to about 200:1. The atom ratio of aluminum to titanium can range from about 20:1 to about 10,000:1 more preferably from about 75:1 to about 5,000:1. The atom ratio of aluminum to magnesium can range from about 0.1:1 to about 4:1, more preferably from about 0.5:1 to about 2:1.

Any alpha-olefin, or mixture thereof, can be polymerized in the presence of the catalyst of the present invention with the preferred reactant being ethylene or ethylene plus another higher aliphatic mono-1-olefin containing from 3–10 carbon atoms. The catalysts are of particular utility in the polymerization of ethylene or the copolymerization of ethylene and minor amounts of propylene, butene-1 or hexene-1, in an inert hydrocarbon diluent at a temperature at which the resulting polymer is insoluble in the diluent.

By minor amounts is meant up to about a total of 20 mole % comonomer(s).

Broadly, the polymerization conditions employed in this invention are similar to certain known processes in which a catalyst system comprising a titanium tetrahalide and an organoaluminum compound are used. The alpha olefin is polymerized by contact with the catalyst system of this invention in solution, in suspension or in gaseous phase.

In the preferred process, ethylene is polymerized in a particle form system which is conducted in the presence of a diluent under conditions of temperature and pressure such that the diluent is in the liquid phase and the resulting polymer is insoluble in the diluent. The polymerization temperature generally falls in the range of 0° to 150° C., more preferably about 40° to 112° C. Any convenient partial pressure of ethylene can be used. The partial pressure generally falls within the range of about 10 to 500 psia (69 to 3450 kPa). The concentration of titanium compound per liter of diluent during the polymerization can vary within the range of about 0.0005 to 10, more preferably from about 0.001 to 2 millimoles per liter of diluent.

The diluent used in the polymerization process is one which is unreactive under the conditions employed, although in certain instances, the diluent and monomer can be the same. The diluent is preferably a hydrocarbon such as isobutane, n-pentane, cyclohexane and the like.

As is known in the art, control of the molecular weight of the polymer can be obtained by the presence of hydrogen in the reactor during polymerization.

The polymerization process used for producing ethylene polymers, according to this invention, can be any of the well-known processes including batch and continuous processes.

It is convenient when polymerizing ethylene in bench scale process, for example, to conduct the polymerization batchwise in a stirred reactor employing a dry hydrocarbon diluent inert in the process such as isobutane, n-heptane, methylcyclohexane, benzene, toluene, and the like at a reactor temperature of about 100° C. and a reactor pressure of about 500-650 psia (3.4-4.5 MPa). Ethylene is admitted to the reactor as required to maintain the desired pressure. Molecular weight control agents such as hydrogen can be employed in the reactor as known in the art to adjust the molecular weight of the polymer.

When the selected polymerization time is reached the reaction can be terminated by discontinuing the flow of ethylene and comonomer, if used, venting unreacted monomer(s) and diluent and recovering the polymer. The recovered product can be treated to deactivate or remove catalyst residues such as by an alcohol wash, can be stabilized by admixture with an antioxidant(s) and can be dried to remove residual solvent, if present and as is known in the art. The final product can be further processed into pellets and/or converted into the final shaped product.

In a continuous process, a suitable reactor such as a loop reactor is continuously charged with suitable quantities of solvent or diluent, catalyst, cocatalyst, ethylene, hydrogen (if any), and comonomer (if any). Reactor product is continuously withdrawn and solid polymer recovered from it by suitable means such as by flashing.

It is also emphasized that the compositions of matter of the present invention should be prepared in an oxygen free system e.g., absence of air as well as a dry system i.e., absence of water. Generally a dry box is employed as known in the art to prepare the compositions of the present invention usually employing a dry, oxygen-free nitrogen or argon atmosphere.

EXAMPLE 1

(Control)

Prepolymer Applied to Catalyst

A catalyst was prepared in a 30 gal (113L) Pfaudler reactor by charging it with 15 gal (56.7 L) of dry n-hexane, 1.23 lbs (5.88 moles) of dry $MgCl_2$ powder and 6 lbs (11.9 moles) of titanium tetraethoxide ($Ti(OEt)_4$) under a nitrogen atmosphere with stirring. The stirred mixture was heated to about 90° C., held there for 5 minutes and cooled to 25° C. To the mixture over a 4 hour period with cooling was added 12.5 lbs of ethylaluminum sesquichloride solution (EASC) as a 26 wt. percent solution in n-heptane equivalent to 3.25 lbs (5.96 moles) of EASC. The temperature ranged from about 16° to 25° C. during the addition. Following the EASC addition, 1.2 lbs (544.3 g) of ethylene was charged to the mixture over a 30 minute period of time with a reactor temperature of about 19° C. After stirring the mixture for about 20 minutes longer the stirrer was turned off and the solids allowed to settle. The mother liquor was decanted and catalyst slurry was washed (mixed) with about 6 gal (22 L) of fresh n-hexane, the slurry allowed to settle and the wash liquid removed by decanting. The wash sequence was repeated 3 times using about 6 gal of fresh n-hexane each time with the temperature ranging from about 19° to 23° C. After the final decanting 10 gal (38 L) of n-hexane and 12 lbs (5.44 kg, 28.7 moles) of $TiCl_4$ was charged. While stirring the mixture was heated to about 55° C. then cooled to about 31° C. The stirrer was turned off, the solids allowed to settle and solids washed 4 times as before following the solvent-decanting sequence previously used. The catalyst slurry was transferred to a holding vessel pending further use. The calculated amount of prepolymer was about 14 weight percent.

Individual portions of the dry catalyst were used in several runs for polymerizing ethylene at 100° C. in a 1 gal (3.8 L) stirred stainless steel reactor containing 1200 mL (668 g) of dry isobutane diluent, 0.5 mL (0.45 mmole) of triethylaluminum (TEA) as cocatalyst as a 15 wt. percent solution in n-heptane and the desired amount of hydrogen to provide the desired polymer melt index. The hydrogen partial pressure ($\Delta p$) was supplied from a standardized pressurized 2425 mL vessel.

Each polymerization run was terminated by venting the gaseous reactants. The recovered polymer was dried, weighed to ascertain the yield, stabilized with about 0.2 weight percent of a conventional antioxidant system, and its melt index (MI) determined in accordance with ASTM D 1238 at 190° C. and a load of 2.16 kg.

About 100 g of the dry, stabilized polymer sample recovered from each run was ground for 2 minutes in a Waring Blender at high speed. The particle size distribution of the ground polymer was determined by placing the ground sample on a set of sieves having mesh sizes of 30, 50, 80, 100, 200 and pan (U.S. Sieve Sizes) and mechanically agitating the set for 15 minutes. The amount of powder remaining on the pan and each sieve was determined by weighing. The purpose of grinding the polymer is to artificially simulate the attrition polymer particles appear to receive in a large scale reactor such as a loop reactor since particles formed in such reactors are generally finer than those made in bench scale reactors. The grinding results may be helpful to some extent as a screening guide in selecting catalysts that may provide coarser polymer particles in a commercial operation.

Fines content is reported as the weight percent of polymer particles smaller than 100 mesh.

Calculated catalyst productivity is reported as kg polymer per g catalyst per hour, abbreviated kg/g/hr.

The other pertinent reactor conditions and the results obtained are reported in Table 1.

isolated, washed with n-hexane until essentially all visual evidence of $TiCl_4$ in the wash liquid was gone, e.g. the filtrate was colorless, and the washed solids were dried under vacuum at room temperature to provide a powder. The powder contained about 50 weight percent HDPE fibrils and 50 weight percent catalyst.

Individual portions of the dry catalyst were used in polymerizing ethylene in several runs in a particle form process as set forth in Example 1.

The pertinent reactor conditions and the results obtained are presented in Table 2.

TABLE 1

Ethylene Polymerization With Control Catalyst
No Polymer Fibrils Used in Catalyst Production

| Run No. | Catalyst mg. | Cocatalyst mmole | Pressures | | Polymer | | | Calculated Productivity kg/g/hr |
|---|---|---|---|---|---|---|---|---|
| | | | Hydrogen ΔP, MPa | Reactor MPa | Yield g | MI | Fines Wt. % | |
| 1 | 7.7 | 0.45 | 0.345 | 3.76 | 543 | 0.96 | 25.2 | 70.5 |
| 2 | 11.0 | 0.45 | 0.552 | 4.03 | 735 | 11.2 | 47.7 | 66.8 |
| 3 | 10.2 | 0.45 | 0.827 | 4.31 | 307 | 12.1 | 68.5 | 30.1 |
| 4 | 10.9 | 0.45 | 1.03 | 4.59 | 712 | 45.5 | 75.8 | 65.3 |

TABLE 2

Ethylene Polymerization
Catalyst Prepared With HDPE Fibrils, No Prepolymer on Catalyst

| Run No. | Catalyst mg. | Cocatalyst mmole | Pressures | | Polymer | | | Calculated Productivity[a] kg/g/hr |
|---|---|---|---|---|---|---|---|---|
| | | | Hydrogen ΔP, MPa | Reactor MPa | Yield g | MI | Fines Wt. % | |
| 1 | 52.0 | 2.7 | 0.207 | 3.59 | 304 | 0.52 | 12.4 | 5.85 |
| 2 | 43.5 | 2.7 | 0.414 | 3.65 | 322 | 14. | 39.4 | 7.40 |

[a]Since the catalyst composition contains 50 weight catalyst the calculated productivity in terms of kg polymer per g catalyst per hour becomes 11.7 kg/g cat/hr in run 3 and 14.8 kg polymer/g cat/hr in run 4.

The data based on the grinding test show that polymer fines increase as the polymer melt index increases.

EXAMPLE 2

(Invention)

The catalyst was prepared in the presence of 5 g of linear high density polyethylene (HDPE) fibrils slurried into about 400 mL of dry xylene contained in a 1 liter flask arranged for nitrogen purging, magnetic stirring and refluxing. The fibrils were made by dissolving the HDPE in about 400 mL of xylene at 120° C., then pouring the hot solution into about 200 mL of xylene in a Waring blender operating at moderate speed. The stirred mixture was cooled to about 25° C. at ambient temperature then the stirrer operated at high speed for about 1 minute. The HDPE had a high load melt index of about 1 as determined in accordance with ASTM D 1238 at a temperature of 190° C. and a load of 21.6 kg.

To the fibril slurry at about 25° C. was added 2 g (0.021 mole) of $MgCl_2$ powder (dried under nitrogen for several hours at 420° C.) and 8.4 mL (9.3 g, 0.041 mole) of titanium tetraethoxide, $Ti(OEt)_4$. The mixture was then heated to about 70°-80° C. and held there for 1.5 hours to effect dissolution of the metal compounds, then cooled to room temperature (about 25° C.). To the cooled mixture over a 45 minute interval was added 30 mL (5.8 g, 0.026 mole) of a 25.4 wt. percent solution of ethylaluminum sesquichloride (EASC) contained in n-heptane. The resulting slurry was stirred an additional 30 minutes then the settled solids were washed 4 times with about 700 mL portions of dry n-hexane with decanting of the wash liquid. The slurry was then diluted to about 500 mL with fresh n-hexane, 10 mL (17.3 g) of $TiCl_4$ was added and the mixture was stirred at room temperature for 1 hour. After settling, the solids were As with the control catalyst of Example 1 the results indicate that polymer fines increase as polymer melt index increases. However, at about the same polymer melt index level, the inventive catalyst produces less polymer fines than are those obtained with the control catalyst of Example 1 containing polyethylene deposited thereon during catalyst manufacture. For example at a polymer MI of 14, the invention catalyst gave polymer fines of about 39 weight percent. At polymer MI's of 11.2 and 12.1, the control catalyst gave polymer fines of about 48 and 68 weight percent, respectively. At a polymer MI of 14, the control catalyst would be expected to give polymer fines between about 69 to 76 weight percent.

At a MI less than about 1, the invention catalyst produced about one-half the fines of the control catalyst. On a productivity basis alone the invention catalyst appears to be less active than the control catalyst. This is partly due to the higher cocatalyst level used in the invention catalyst runs. Data accumulated with Ti-Mg catalysts made in the manner shown for the control catalyst of Example 1 indicate that, with a TEA cocatalyst, as the TEA content decreases from about 3 mmoles (invention runs) to 0.5 mmole (control runs) the productivity of the catalyst approximately doubles. Even compensating for this difference in cocatalyst level the invention catalyst is less active. Since the catalysts were prepared under somewhat different conditions (invention in bench scale control in pilot plant scale) there were probably different poison levels encountered. The trends observed, however, are still valid for each catalyst and point out that less polymer fines are made with the invention catalyst.

EXAMPLE 3

(Invention)

The catalyst was prepared in the manner and with the same quantities of reagents described in Example 2. However, after treating the solution of $MgCl_2$ and $Ti(OEt)_4$ containing HDPE fibrils with EASC solution a small additional amount, 2 mL (0.0017 mole) of EASC solution was added and ethylene gas was bubbled into the slurry for 2 hours. The settled solids were washed with n-hexane, treated with $TiCl_4$ and washed again with n-hexane as previously detailed.

This catalyst differs from that of Example 2 in that an estimated 10–15 weight percent prepolymer (polyethylene) was applied to the catalyst particles during its preparation.

As before individual portions of the catalyst were used in several runs to polymerize ethylene.

The pertinent reactor conditions and the results obtained are reported in Table 3.

TABLE 3

Ethylene Polymerization
Catalyst Prepared With HDPE Fibrils and Containing Prepolymer

| Run No. | Catalyst mg. | Cocatalyst mmole | Pressures | | Polymer | | | Calculated Productivity kg/g/hr |
|---|---|---|---|---|---|---|---|---|
| | | | Hydrogen ΔP, MPa | Reactor MPa | Yield g | MI | Fines Wt. % | |
| 1 | 57.1 | 2.7 | 0.207 | 3.59 | 315 | 0.47 | 4.5 | 5.52 |
| 2 | 62.7 | 2.7 | 0.414 | 3.65 | 275 | 10.6 | 14.9 | 4.39 |

In comparing the results in Table 3 with those of Table 2 it is evident that polymer fines can be additionally reduced by approximately 50 percent by applying a prepolymer (polyethylene) to the catalyst particles which have been prepared in the presence of HDPE fibrils.

EXAMPLE 4

(Control)

The catalyst was prepared in the general manner described in Example 1 except that a n-hexane solution of 0.95 lbs (4.52 moles) of $MgCl_2$ and 5.3 lbs (10.5 moles) of $Ti(O\,Et)_4$ was simultaneously introduced into the stirred reactor at 50° C. with 10 lbs of ethylaluminum dichloride (EADC) solution as a 25 weight percent solution in n-heptane equivalent to 2.5 lbs (8.93 moles) of EADC. The settled solids were by decantation as before, then treated with 7 lbs (16.7 moles) of $TiCl_4$ at 50° C. for 1 hour and finally washed as before, then a portion thereof dried under argon in a dry box.

A portion of the dry product, 45 g, was admixed with 405 g of HDPE powder overnight on a roller mill in a container containing a stainless steel rod to aid in the mixing process. The composition contained 10 weight percent catalyst and 90 weight percent HDPE.

A portion of the dry catalyst and the HDPE-diluted catalyst were individually tested in ethylene polymerization as before, identified as runs 1 and 2, respectively, in Table 4.

The pertinent reactor conditions and the results obtained are reported in Table 4.

TABLE 4

Ethylene Polymerization
Catalyst Prepared In Absence of HDPE Fibrils But Diluted with HDPE

| Run No. | Catalyst mg. | Cocatalyst mmole | Pressures | | Polymer | | | Calculated Productivity kg/g/hr |
|---|---|---|---|---|---|---|---|---|
| | | | Hydrogen ΔP, MPa | Reactor MPa | Yield g | MI | Fines Wt. % | |
| 1 | 4.3 | 0.45 | 0.345 | 3.76 | 229 | 1.23 | 7.3 | 53.3 |
| 2 | 30.1 | 0.45 | 0.345 | 3.76 | 318 | 0.85 | 14.0 | 10.5* |

*On the basis of catalyst only since the diluted catalyst composition is 10 weight percent catalyst and 90 weight percent HDPE fines, the calculated productivity then becomes 105 by polymer per g catalyst per hour.

The results in Table 4 indicate that diluting the catalyst with HDPE fines (powder) resulted in approximately doubling the amount of polymer fines in the grinding test compared to the undiluted catalyst at about the same polymer melt index. This behavior is opposite to that observed with the invention catalyst.

What is claimed is:

1. A process comprising contacting at least one alpha-olefin with a polymerization catalyst under polymerization conditions, wherein the polymerization catalyst comprises a particulate diluent and a product precipitated in the presence of the particulate diluent, the product being formed by mixing under precipitation conditions a component solution and a precipitating agent, wherein the component solution is formed by the combination of:

(1) a metal halide compound selected from the group consisting of metal dihalide compounds and metal hydroxyhalide compounds and the metal of the metal halide compound is selected from the group consisting of Group IIA metals and Group IIB metals of the Periodic Table, and (2) a transition metal compound in which the transition metal is selected from the group consisting of Group IVB and Group VB transition metals of the Periodic Table and the transition metal is bonded to at least one atom selected from the group consisting of oxygen, nitrogen and sulfur, and said oxygen, nitrogen and sulfur atoms are in turn bonded to a carbon atom of a carbon containing radical, in a suitable solvent;

wherein the precipitating agent is selected from the group consisting of organometallic compounds wherein the metal is selected from the group consisting of Group I, Group II, and Group III metals of the Periodic Table, metal halides and oxygen containing halides of elements selected from the group consisting of Group IIIA, Group IVA, Group IVB, Group VA, and Group VB of the Periodic Table, hydrogen halides, and organic acid halides selected from the group consisting of compounds having the formula

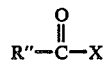

wherein R" is an alkyl, aryl, or cycloalkyl group or combinations thereof containing from 1 to about 12 carbon atoms and X is a halide.

2. A process as in claim 1 wherein the at least one alpha-olefin comprises a mono-1-olefin.

3. A process as in claim 1 wherein the at least one alpha-olefin comprises ethylene.

4. A process as in claim 1 wherein the catalyst further comprises an amount of prepolymer deposited on the catalyst.

5. A process as in claim 4 wherein the particulate diluent comprises polyethylene fibrils and wherein the prepolymer comprises polyethylene.

6. A process as in claim 4 wherein the particulate diluent comprises silica.

7. A process as in claim 6 wherein the catalyst further comprises in combination at least one organoaluminum compound represented by the formula $AlR'''_e Y_{3-e}$ wherein R''' represents a hydrocarbyl radical containing from 1 to about 20 carbon atoms, Y represents a monovalent radical selected from the group consisting of hydrogen and halogen and e is an integer of 1 to 3, the combination forming a catalyst system.

8. A process as in claim 7 wherein the catalyst system is contacted with ethylene in a presence of a liquid hydrocarbon diluent under conditions of temperature and pressure such that the diluent is in the liquid phase and the resulting polymer is substantially insoluble in said diluent.

9. A process comprising contacting at least one alpha-olefin with a polymerization catalyst together with a suitable cocatalyst forming a catalyst system under polymerization conditions, wherein the polymerization catalyst comprises a particulate diluent selected from the group consisting of silica, silica-alumina, silica-titania, magnesium dichloride, magnesium oxide, poly(phenylene)sulfide, polyethylene, and polypropylene and a product precipitated in the presence of the particulate diluent, the product being formed by adding under precipitation conditions a precipitating agent to a mixture of a component solution and the particulate diluent, wherein the component solution is formed by the combination of:

(1) a metal halide compound selected from the group consisting of metal dihalide compounds and metal hydroxyhalide compounds and the metal of the metal halide compound is selected from the group consisting of Group IIA metals and Group IIB metals of the Periodic Table, and (2) a transition metal compound in which the transition metal is selected from the group consisting of Group IVB and Group VB transition metals of the Periodic Table and the transition metal is bonded to at least one atom selected from the group consisting of oxygen, nitrogen and sulfur, and said oxygen, nitrogen and sulfur atoms are in turn bonded to a carbon atom of a carbon containing radical, in a suitable solvent;

wherein the precipitating agent is selected from the group consisting of organometallic compounds wherein the metal is selected from the group consisting of Group I, Group II, and Group III metals of the Periodic Table, metal halides and oxygen containing halides of elements selected from the group consisting of Group IIIA, Group IVA, Group IVB, Group VA, and Group VB of the Periodic Table, hydrogen, halides, and organic acid halides selected from the group consisting of compounds having the formula

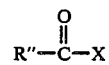

wherein R" is an alkyl, aryl, or cycloalkyl group or combinations thereof containing from 1 to about 12 carbon atoms and X is a halide;

said polymerization catalyst further having been activated by treatment with a halogenated metal compound represented by the formula $M'X_c(OR)_{d-c}$ in which M' is selected from the group consisting of zirconium, titanium, vanadium, silicon and tin, X stands for bromine, chlorine, iodine or mixtures thereof, R is alkyl, cycoalkyl, aryl or mixtures thereof, d is the valence of M', and c is less than or equal to d and is an integer of 1 to 4.

10. A process as in claim 9 wherein the at least one alpha-olefin comprises a mono-1-olefin 11. A process as in claim 9 wherein the at least one alpha-olefin comprises ethylene.

12. A process as in claim 9 wherein the catalyst system further comprises an amount of prepolymer deposited on the polymerization catalyst.

13. A process as in claim 12 wherein the particulate diluent comprises polyethylene fibrils and wherein the prepolymer comprises polyethylene.

14. A process as in claim 9 wherein the particulate diluent comprises silica, wherein the metal halide compound comprises magnesium dichloride, wherein the transition metal compound comprises titanium tetraalkoxide, the precipitating agent is selected from the group consisting of ethylaluminum sesquichloride and ethylaluminum dichloride, and the halogenated metal compound comprises titanium tetrachloride.

15. A process as in claim 14 wherein the cocatalyst comprises at least one organoaluminum compound represented by the formula $AlR'''_e Y_{3-e}$ wherein R''' represents a hydrocarbyl radical containing from 1 to about 20 carbon atoms, Y represents a monovalent radical selected from the group consisting of hydrogen and halogen and e is an integer of 1 to 3, the combination forming a catalyst system.

16. A process as in claim 15 wherein the catalyst system is contacted with ethylene in a presence of a liquid hydrocarbon diluent under conditions of temperature and pressure such that the diluent is in the liquid phase and the resulting polymer is substantially insoluble in said diluent.

* * * * *